March 6, 1934.  LE ROY CHADWICK  1,949,452

PINCERS

Filed Feb. 16, 1933

Inventor
Le Roy Chadwick.
By Geo. Stevens.
Attorney

Patented Mar. 6, 1934

1,949,452

UNITED STATES PATENT OFFICE 1,949,452

PINCERS

Le Roy Chadwick, St. Paul, Minn.

Application February 16, 1933, Serial No. 657,065

2 Claims. (Cl. 17—7)

This invention relates to improvements in pincers, and has for its principal object to provide a more efficient pair of pincers or tongs particularly adapted for use in handling a fish when scaling or the like, though it is to be understood that the same may be used for many other purposes for the holding of otherwise slippery or hard to handle material, such as hides when in the act of skinning an animal or the like.

Other objects and advantages of the invention will appear in the following description thereof.

Referring now to the accompanying drawing forming part of this application and wherein like reference characters indicate like parts:

Figure 1:
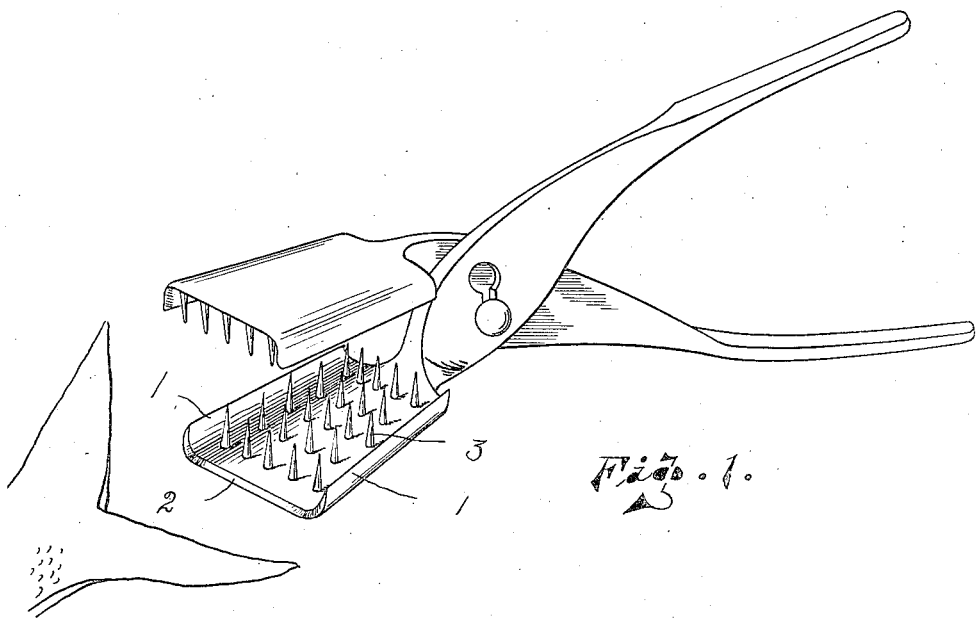
Figure 1 is a perspective view of a pair of the improved pincers partly open.
Figure 2:
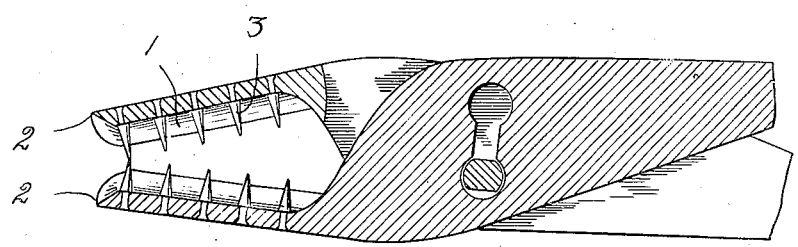
Figure 2 is an approximate central section through the pincers when closed.

The general assembly of the adjustable pivotal handle arrangement is similar to that found in many like devices, but the jaw structure for holding purposes differs materially from that known in the art and upon which the present invention is predicated.

The jaws are alike and in cross section generally U or channel shaped, having inwardly turned or flanged sides 1, which are comparatively sharp along their meeting edges, and the forward lips are also chamfered from the inside and sharpened as at 2.

The inside of the jaws are provided with staggered series or rows of sharpened teeth or spikes indicated at 3, they being so arranged that the rows of teeth are practically aligned when the jaws are closed to parallel position, but when fully closed, only the extreme forward rows of teeth engage each other so that a positive gripping effect is assured even on a very thin object, such as a fish's tail.

The flanged sides are for the purpose of insuring a firm hold of a thicker, softer substance such as a fatty piece of hide, or the belly walls of a larger fish or the like, and the instrument provides a most convenient device for the proper holding of a fish while in the act of removing a hook from its mouth, or while cleaning and preparing the fish for consumption.

Having thus described my invention, what I claim and desire to secure by Letters Patent, is:

1. Pincers of the type described having relatively wide channel shaped jaws, characterized by the side and front edges thereof being sharpened and each jaw carrying a plurality of inwardly protruding teeth, the forward rows only of said teeth meeting when the jaws are in closed position.

2. Pincers having channel shaped jaws, substantially square in plan view, sharpened side and front edges, and staggered rows of teeth protruding inwardly from the inner face of each jaw.

LE ROY CHADWICK.